(12) United States Patent
Johnson

(10) Patent No.: US 7,051,982 B1
(45) Date of Patent: May 30, 2006

(54) FAIRING ARRANGEMENTS FOR AIRCRAFT

(75) Inventor: Brian D Johnson, Bristol (GB)

(73) Assignee: Bae Systems plc, Farnborough (GB)

( * ) Notice: Subject to any disclaimer, the term of this patent is extended or adjusted under 35 U.S.C. 154(b) by 1682 days.

(21) Appl. No.: 09/048,838

(22) Filed: Mar. 27, 1998

(51) Int. Cl.
*B64C 3/50* (2006.01)

(52) U.S. Cl. .................. 244/215; 244/214; 244/213; 244/129.1

(58) Field of Classification Search ............... 244/215, 244/214, 213, 45 R, 129.1, 130
See application file for complete search history.

(56) References Cited

U.S. PATENT DOCUMENTS

| 4,213,587 | A | * | 7/1980 | Roeseler et al. | ............. 244/213 |
| 4,858,853 | A | * | 8/1989 | Westerman et al. | ......... 244/119 |
| 5,071,092 | A | * | 12/1991 | Williams et al. | ......... 244/129.1 |
| 5,156,360 | A | * | 10/1992 | Shine | ...................... 244/129.1 |
| 5,388,788 | A | * | 2/1995 | Rudolph | ..................... 244/215 |
| 5,518,210 | A | * | 5/1996 | Friberg | ....................... 244/215 |

FOREIGN PATENT DOCUMENTS

| GB | 2 235 169 | 2/1991 |
| GB | 2 238 026 | 5/1991 |
| GB | 2 238 991 | 6/1991 |

* cited by examiner

*Primary Examiner*—J. Woodrow Eldred
(74) *Attorney, Agent, or Firm*—Nixon & Vanderhye P.C.

(57) ABSTRACT

A fairing arrangement for bridging an aircraft fixed structure (14) and a control surface (10) hingedly mounted on and angularly displaceable with respect to the aircraft structure is provided, together with a method of producing a flexible seal member for such an arrangement. The fairing arrangement includes first and second fairing portions (22, 24) on the fixed aircraft structure (14) and control surface (10) respectively with an intermediate flexible seal (26) disposed between them. The flexible seal (26) is of composite construction being made of rubber-like material with a series of reinforcing plies ($34^1$ to $34^5$). The plies are of fabric construction and the seal is deformable to accommodate differential movement between the first and second fairing portions (22, 24) to provide a continuous seal therebetween.

15 Claims, 4 Drawing Sheets

FAIRING ARRANGEMENTS FOR AIRCRAFT

BACKGROUND OF THE INVENTION

1. Field of the Invention

This invention relates to fairing arrangements for aircraft and in particular, although not exclusively, to seal arrangements for use with fairings associated with flying control surfaces, for example ailerons. The invention also extends to methods of producing flexible seal members for such fairing arrangements.

2. Discussion of Prior Art

In a typical commercial aircraft such as the Airbus A330 or A340 each wing has an in-board and an out-board aileron and each aileron is actuated by means of two actuator jacks. The size of the actuator and the local geometry mean that the aileron actuator protrudes below the lower wing surface and so the lower surface of the wing and the associated surface of the actuator are formed to provide forward and rearward fairing portions respectively. The typical aileron movement required is +/−30° and a flexible aileron actuator seal is provided between the fairing portions to accommodate at least a major part of this movement and to prevent the ingress of debris etc. Aerodynamic considerations require that the longitudinal axis of the aileron fairing be aligned with the direction of flight but the sweep of the wings means that the aileron hinge axis lies typically at 60° to the longitudinal axis of the fairing. This means that the seal not only has to cope with up to +/−30° aileron movement but also with a translational movement generated because of the angular offset of the hinge axis.

DESCRIPTION OF THE PRIOR ART

There have been several earlier proposals to cope with the extreme demands placed on the seal and these have largely consisted of independently flexible fingers or flexible rods intended to cope with the compound movement.

For example in our British Published Patent Application GB 2 235 169A, we claim such an externally mounted fairing arrangement in which fairing portions respectively fixed to the aircraft fixed structure and the control surface are bridged by an intermediate flexible sealing portion comprising a labyrinth seal of two or more overlapping or interconnected sealing elements which can accommodate differential movement between the fixed fairing portions when the control surface is angularly displaced relative to the aircraft fixed structure, i.e. the wing.

An alternative sealing arrangement is disclosed in our British Published Application GB 2 238 991A, in which the intermediate flexible sealing portion comprises a single element sealing diaphragm which is deformable to accommodate the differential movement between the respective fairing portions. In the preferred arrangement, the diaphragm includes surface stabilising elements either stitched or moulded in-situ. These stabilising elements can be single flexible rods, for example of circular cross section or of some other suitable cross-section.

In our British Published Patent Application 2 238 026A we describe a fairing arrangement in which the seal arrangement comprises a flexible single element sealing diaphragm which includes grouped layers of flexible rods lying substantially parallel.

In our European Published Application EP 0 427 491A we describe an arrangement in which the flexible seal arrangement comprises two or more slidable overlapping staggered layers of longitudinally extending fingers.

In practice, we have found that although these above arrangements perform well they have a relatively short life. Thus, where the fingers are of metal, the requirement to provide some pre-stressing and an ability to accommodate up to +/−30° movement means that the fingers are susceptible to metal fatigue. This can be exacerbated by the fact that when the aircraft is idle, the ailerons droop to −30° and obviously can be left in this state for extended periods.

In addition to the potential problems due to metal fatigue, the finger-type seals are complicated and thus expensive to manufacture.

In this Specification, the terms forward, rearward, up, down, etc. are made with reference to an aircraft in straight and level flight. The terms inner and outer when applied to the seal member refer to the internal and exposed external surfaces when in use.

Accordingly, there is a requirement for a seal arrangement with a greater life expectancy and which is able to cope with most of the demands referred to above and which provides a generally smooth continuous surface in normal cruise flight to minimise drag.

SUMMARY OF THE INVENTION

Somewhat surprisingly, we have found that it is possible to make a composite rubber or rubber-like seal arrangement incorporating fabric reinforcement which is capable of meeting many if not all of the above demands. In particular, given the extreme angular movement required in combination with the translational movement, we have been able to design a seal which is capable of the substantial bending and stretching as required.

Accordingly, in one aspect of this invention there is provided a fairing arrangement for bridging an aircraft fixed structure and a control surface hingedly mounted on and angularly displaceable with respect to said aircraft structure, said fairing arrangement including:

a first fairing portion located on said fixed aircraft structure, a second fairing portion located on said control surface, and an intermediate flexible seal member disposed between said first and second fairing portions and having a proximal edge region fixed relative to one of said first and second fairing portions and a distal edge region, wherein said flexible seal member comprises a composite sheet element of rubber or rubber-like material incorporating a plurality of reinforcing plies across at least part of said sheet element, each ply comprising one or more fabric elements, whereby the seal arrangement is deformable to accommodate differential movement between said first and second fairing portions when said control surface is angularly displaced with respect to the fixed aircraft structure and said seal arrangement defines a surface which generally conforms to the adjacent portions of said first and second fairing portions throughout at least a major extent of the range of said angular displacement of said control surface.

It is preferred for the seal member to comprise several plies, for example 3 to 5 or more, stacked together.

Preferably, at least one of plies extends across substantially the whole of the sheet element. Preferably, at least one of said plies comprises a plurality of fabric elements butted against a neighbouring fabric element in the same ply without significant overlap.

To provide local stiffening, at least one of the plies may include a fabric element comprising a cloth strip element extending along the distal edge region of the flexible seal member, with the axis of maximum tensile strength of the strip element extending generally along the distal edge. Likewise, the same or another one of the plies may include cloth strip elements extending along each of the side edge regions with the axis of maximum tensile strength extending along the associated side edge region.

It is preferred for the plies together to define a specialised form of leaf spring which is capable of flexing through substantial angles but also capable of expansion and retraction along its distal border without significant buckling.

Thus one of said plies may comprises a main fabric element extending over at least a central portion of the seal member to confer flexural strength thereto. One of the other plies may comprise a buckle-reduction fabric element extending from the proximal edge of said seal member and of lesser extent of said main fabric element.

The inner surface of the seal member preferably comprises a layer of low friction sheet material in at least said distal edge region. The distal edge region preferably includes a bulbous lip or bead on its inner surface.

The rubber or rubber-like material preferably comprises a mouldable silicone rubber.

The seal member preferably includes a drain aperture for draining fluid or other material which may collect in use on the inner surface of said seal member.

According to another aspect of this invention, there is provided a method of producing a flexible seal member for a fairing arrangement comprises:

providing a tool having a mould surface conforming to the required shape of said flexible seal member, placing on said mould surface a plurality of reinforcing plies extending across at least a major portion of said mould surface, each ply comprising one or more fabric elements and selected to provided the formed seal member with required flexural and extension characteristics, impregnating said fabric elements with a curable or rubber or rubber-like material, and curing said rubber or rubber-like material to provide a composite fabric reinforced seal member.

The fabric elements are preferably pre-impregnated with said rubber or rubber-like material before placing on said mould surface. Such impregnation may be by any suitable method known to those skilled in the art, for example by calendering.

Whilst the invention has been described above, it extends to any inventive combination of features set out above or in the following description or claims.

BRIEF DESCRIPTION OF THE DRAWINGS

The invention may be performed in various ways and an embodiment thereof will now be described by way of example only, reference being made to the accompanying drawings, in which.

DESCRIPTION OF THE PREFERRED
Embodiment

Figure 1:
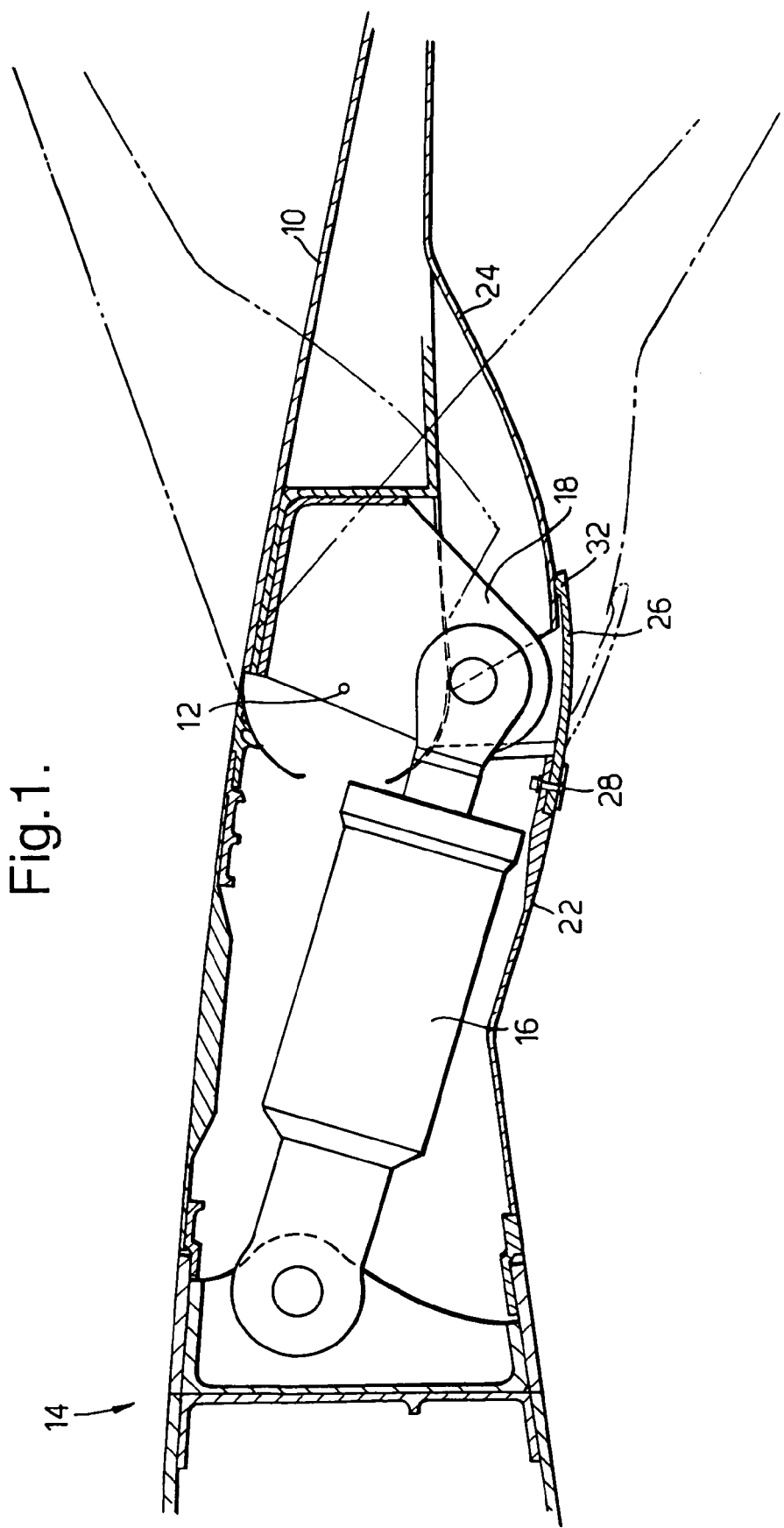
FIG. 1 is a cross-section through an aileron fairing showing the aft part of the wing, the forward part of the aileron, and the actuator jack.
Figure 2:
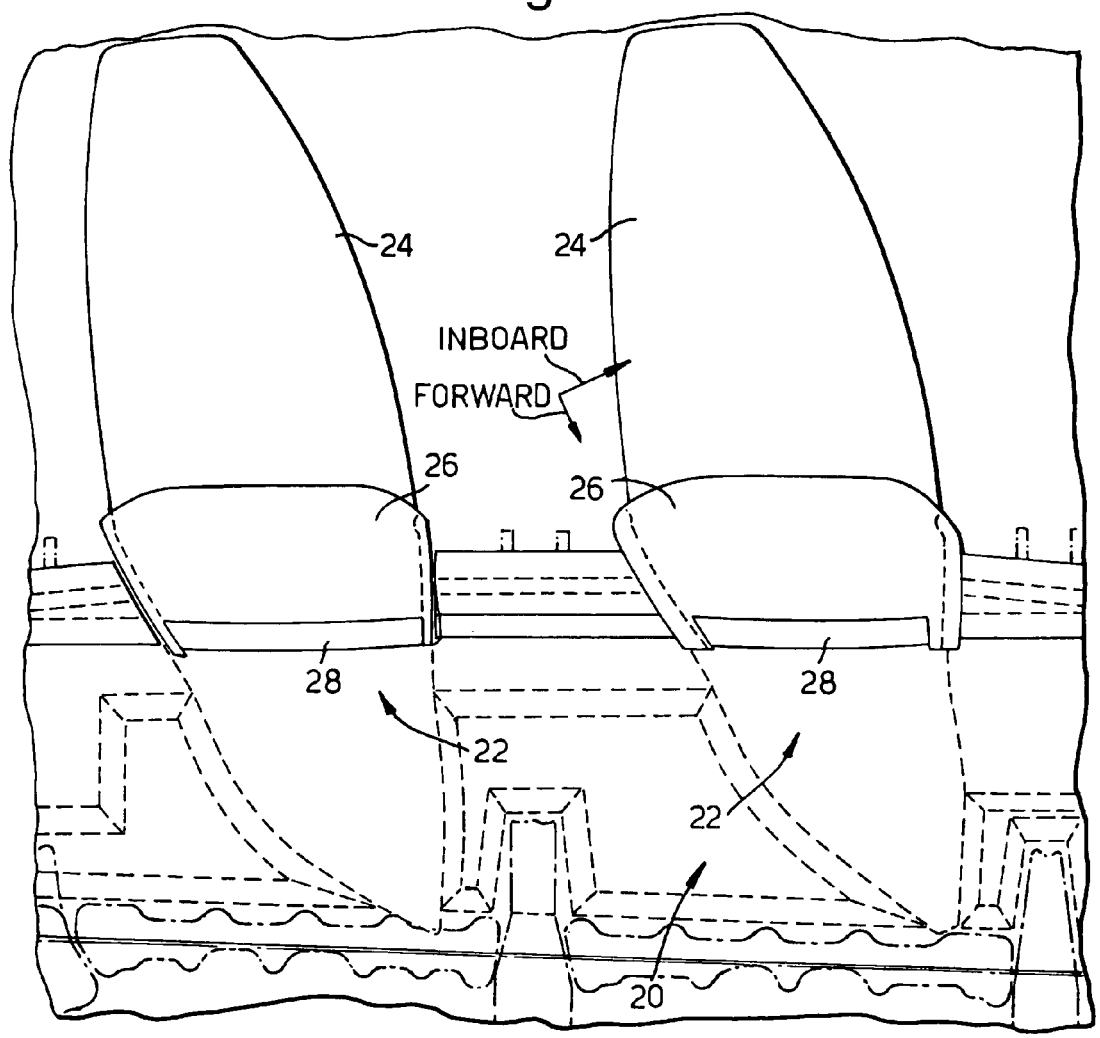
FIG. 2 is an underneath plan view of one of the ailerons.
Figure 3:
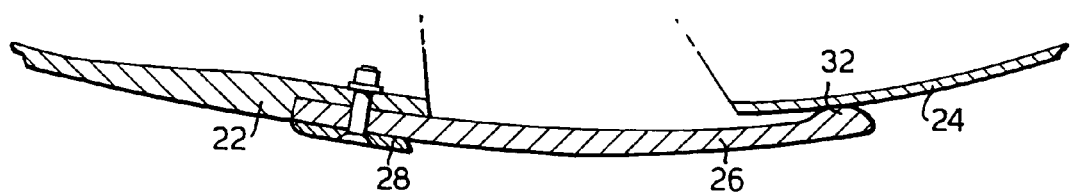
FIG. 3 is a detailed view of the principle aileron fairing parts.

Referring initially to FIGS. 1 to 3, an aileron 10 is pivotally mounted at 12 to the main wing portion 14. An aileron actuator jack 16 is pivotally mounted at one end to a fixed structure of the main wing portion 14 and at its other end to a bracket 18 on the aileron 10. In this example, the actuator jack 16 is capable of deflecting the aileron 10 by +/−30°. It will be seen that the actuator jack 16 protrudes below the line of the main wing portion 14 and that the underwing panel 20 is formed to provide a fairing portion 22. Likewise, the aileron 10 is provided with a corresponding aileron fairing 24. In this invention, the main wing fairing 22 and the aileron fairing 24 are bridged by means of a conformable flexible rubber seal 26, attached to the aft part of the main wing fairing portion 22 by means of a clamp strap 28.

The seal 26 defines a continuous bridging surface between the main wing fairing and the aileron fairing for aileron movement in the range of −30° to +10°. Throughout this range of movement, the seal 26 remains substantially in contact with the aileron fairing 24 and flexes to accommodate the flexing movement caused by angular displacement of the aileron as well as the stretching or contraction required because of the translation of the aileron fairing 24 which occurs because the longitudinal axis of the aileron fairing is not perpendicular to the hinge axis of aileron.

Figure 4:
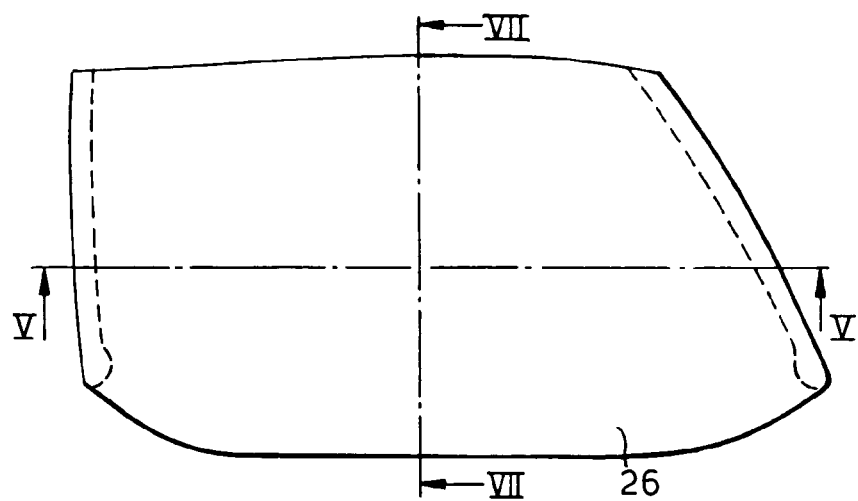
FIG. 4 is a plan view of an aileron seal.
Figure 5:
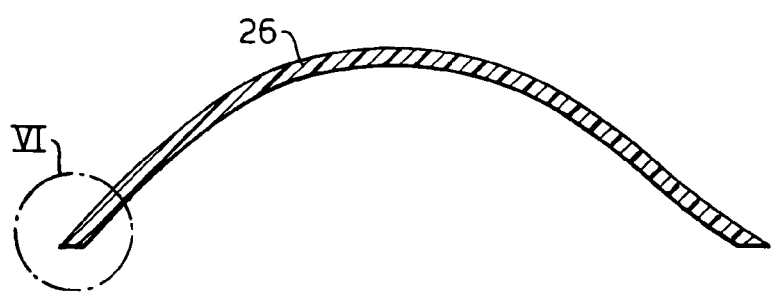
FIG. 5 is a section view taken on arrows V—V of FIG. 4.

As can be seen from FIG. 4 onwards, the flexible seal 26 is generally trapezoidal in plan and arcuate in section, but it should be appreciated that the shape of the seal will be selected according to the particular aileron and actuator position for which it is intended, as the shape of the main wing and aileron fairings 22, 24 are usually different for each actuator.

Figure 7:
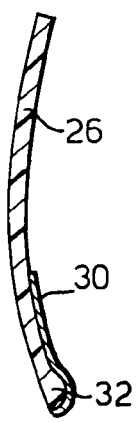
FIG. 7 is a section view taken on arrows VII—VII of FIG. 4.
Figure 8A:
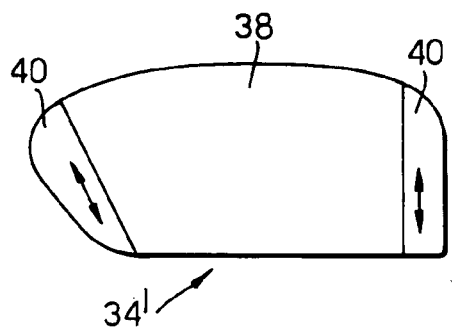
FIGS. 8(*a*) to (*e*) show the fabric blanks used in each of the plies, in this example.
Figure 8B:
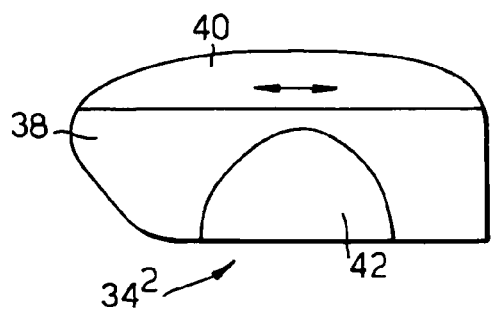
Figure 8C:
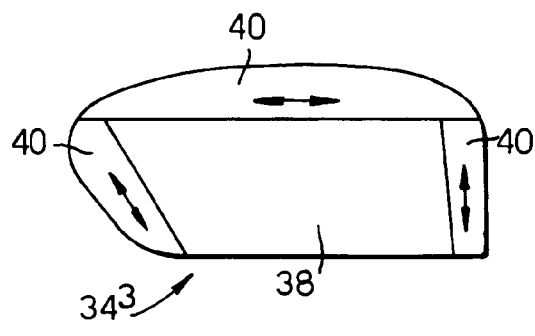
Figure 8D:
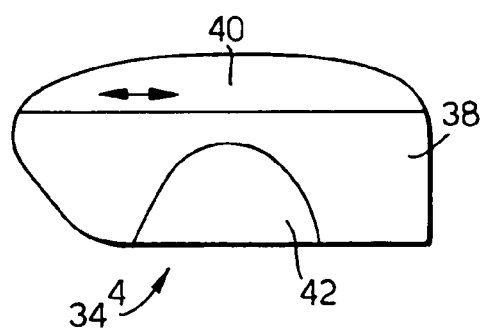
Figure 8E:
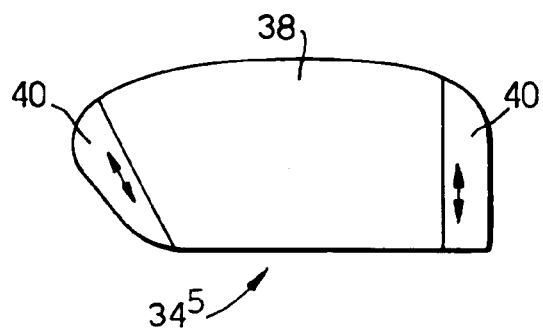

The flexible seal 26 shown in FIG. 7 includes a layer of low-friction material 30 on its inner surface and is also formed with a bulbous lip 32 at its free or distal end. The lip 32 is designed to give a good sliding seal with the aileron fairing 24 as the aileron 10 is angularly displaced. The lip 32 also assists smooth re-engagement if the design of the aileron fairing 24 is such that it leaves contact with the seal 26 at the extreme upper deflections.

Figure 6:
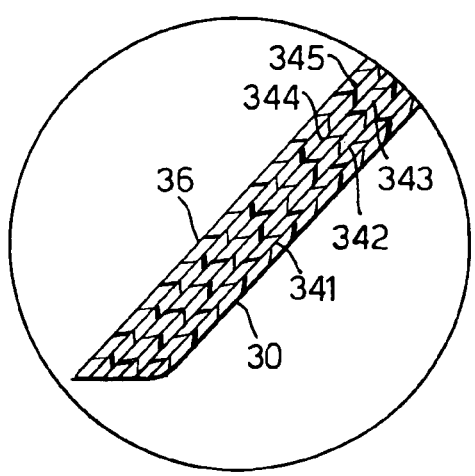
FIG. 6 is a detailed view on region VI of FIG. 5 showing the ply structure.

Referring now particularly to FIGS. 6 and 8, the seal 26 is of multi-ply construction, here made up of five plies 341 to 345 together with an abrasion resistant outer layer 36, the plies being moulded integrally in a matrix of synthetic silicone rubber material.

FIG. 8 shows a typical example of the plies used to make up one arrangement of a flexible seal 26. It is emphasised that this particular layout is given by way of example only and many other variations are possible. Thus the innermost ply 341 is made up of central piece 38 of knitted polyester material for example that known as PRF90 available from Dunlop Limited or Arvex ET2633 available from Arville Textile Limited. A similar material is used in the other plies 342 to 345 and in similarly referenced and these blanks serve to reinforce the seal. The first ply 341 also includes at its side regions two border strips 40 of plain woven glass fibre material such as PRF 56 available from Dunlop Limited or G502 available from Bestobell Aviation. These strips 40 act as stiffeners for the edge region and again similar material is used to provide stiffening borders along the distal edge region and the side edge region in plies 342 to 345. It should be noted that in each ply the strips are butted up against the adjacent element without overlapping. Finally, to provide a buckle-reduction effect, the second and fourth plies 342 and 344 include a central generally semi-circular portion 42 of a knitted polyester material such as PRF89 available from Dunlop Limited or Baltex 89001 available from W. Ball and Son. Again, in each ply, the central portions are butted up to the central piece 38 and do not overlap it. The portions 42 reduce the stiffness of the seal in this area thus spreading the effect of any buckling and making it less severe.

The silicone rubber material used in the seal is preferably a curable material such as Compound 12.109 available from Woodville Polymers Limited, Compound Number 587LG available from Dunlop Limited, or Compound Number GPB50 available from Specialised Elastomers Limited.

The seal 26 may be made by impregnating the various plies with the uncured silicone material, for example by calendering, and then cutting and laying up the various blanks as shown in FIG. 8 on a tool. A vacuum bag can then be applied and the tool and bag placed in an autoclave for a primary cure at a temperature in the range of from 125° C. to 150° C. for a period of about an hour and at a pressure sufficient to consolidate the components. After the primary curing, the component may be removed from the mould tool and subjected to secondary or post-curing at a temperature of about 160° C. for twelve hours or so. For full production purposes it is envisaged that matched tooling will be provided which should considerably reduce the process times.

The invention claimed is:

1. A fairing arrangement for bridging an aircraft fixed structure and a control surface hingedly mounted on and angularly displaceable with respect to said aircraft structure, said fairing arrangement including:
   a first fairing portion located on said fixed aircraft structure,
   a second fairing portion located on said control surface, and
   an intermediate flexible seal member disposed between said first and second fairing portions and having a proximal edge region fixed relative to one of said first and second fairing portions and a distal edge region,
   wherein said flexible seal member comprises a composite sheet element of rubber or rubber-like material incorporating a plurality of reinforcing plies across at least part of said sheet element, each ply comprising one or more fabric elements, whereby the flexible seal member is deformable to accommodate differential movement between said first and second fairing portions and said flexible seal member defines a surface which generally conforms to the adjacent portions of said first and second fairing portions.

2. A fairing arrangement according to claim 1, wherein at least one of said plies extends across substantially the whole of the sheet element.

3. A fairing arrangement according to claim 1 wherein at least one of said plies comprises a plurality of fabric elements.

4. A fairing arrangement according to claim 3, wherein each of said plurality of fabric elements is butted against a neighbouring fabric element in the same ply without significant overlap.

5. A fairing arrangement according to claim 3 wherein at least one of said plies includes a fabric element comprising a cloth strip element extending along the distal edge region of said flexible sheet element with the axis of maximum tensile strength of said strip element extending generally along the distal edge region.

6. A fairing arrangement according to claim 3 wherein at least one of said plies includes a fabric element comprising a cloth strip element extending along each of the side edge regions of the flexible sheet element which extend between said proximal and distal edge regions, with the axis of maximum tensile strength of said cloth strip element extending generally along the associated side edge region.

7. A fairing arrangement according to claim 1, wherein at least one of said plies comprises a main fabric element extending over at least a central portion of said flexible sheet element to confer flexural strength to said seal member.

8. A fairing arrangement according to claim 7, wherein said one ply, or at least one of said other plies comprises a buckle-reduction fabric element extending from the proximal edge of said flexible sheet element and of lesser extent than said main fabric element and arranged to prevent or reduce the possibility of the flexible sheet element buckling in that region in use.

9. A fairing arrangement according to claim 1, wherein at least the distal region of the inner surface of the flexible sheet element comprises a layer of low friction material.

10. A fairing arrangement according to claim 1, wherein the distal edge of said flexible sheet element includes a bulbous lip or bead.

11. An aircraft wing including a fairing arrangement according to claim 1.

12. A fairing arrangement for bridging an aircraft fixed structure and a control surface hingedly mounted on and angularly displaceable with respect to said aircraft structure, said fairing arrangement including:
   a first fairing portion located on said fixed aircraft structure,
   a second fairing portion located on said control surface, and
   an intermediate flexible seal member disposed between said first and second fairing portions and having a proximal edge region fixed relative to one of said first and second fairing portions and a distal edge region,
   wherein said flexible seal member comprises a composite sheet element of rubber or rubber-like material incorporating a plurality of reinforcing plies across at least part of said sheet element, each ply comprising one or more fabric elements and at least one ply comprising a plurality of fabric elements, whereby the flexible seal member is deformable to accommodate differential movement between said first and second fairing portions and said flexible seal member defines a surface which generally conforms to the adjacent portions of said first and second fairing portions throughout at least a major extent of the range of said angular displacement of said control surface.

13. A fairing arrangement for bridging an aircraft fixed structure and a control surface hingedly mounted on and angularly displaceable with respect to said aircraft structure, said fairing arrangement including:
   a first fairing portion located on said fixed aircraft structure,
   a second fairing portion located on said control surface, and
   an intermediate flexible seal member disposed between said first and second fairing portions and having a proximal edge region fixed relative to one of said first and second fairing portions and a distal edge region,
   wherein said flexible seal member comprises a composite sheet element of rubber or rubber-like material incorporating a plurality of reinforcing plies across at least part of said sheet element, each ply comprising one or more fabric elements and at least one ply comprising a plurality of fabric elements wherein each of said plurality of fabric elements is butted against a neighbouring fabric element in the same ply without significant overlap, whereby the flexible seal member is deformable to accommodate differential movement between said first and second fairing portions and said flexible seal member defines a surface which generally conforms to the adjacent portions of said first and second fairing portions.

14. In a fairing arrangement for bridging an aircraft fixed structure and a control surface, said fixed structure including a first fairing portion located on said fixed structure, said control surface including a second fairing portion located on said control surface, wherein said improvement comprises an intermediate flexible seal member disposed between said first and second fairing portions and having a proximal edge region fixed relative to one of said first and second fairing portions and a distal edge region adjacent to the other of said first and second fairing portions, wherein said flexible seal member comprises a composite sheet element of at least rubber like material incorporating a plurality of reinforcing plies across at least part of said sheet element, each reinforcing ply comprising one or more fabric elements, whereby the flexible seal member is deformable to accommodate differential movement between said first and second fairing portions and said flexible seal member defines a surface which generally conforms to the adjacent portions of said first and second fairing portions.

15. A flexible seal member for aerodynamically bridging a first fairing portion located on a fixed aircraft structure and a second fairing portion located on an adjacent moveable aircraft control surface, said flexible seal member comprising:

a composite sheet element of at least rubber-like material incorporating a plurality of reinforcing plies across at least a portion of said sheet element, each ply comprising one or more fabric elements, whereby said composite sheet element is deformable to conform to accommodate differential movement between said first and second fairing portions while generally conforming to adjacent portions of said first and second fairing portions.

* * * * *